United States Patent
Tominaga et al.

(10) Patent No.: US 12,091,124 B2
(45) Date of Patent: Sep. 17, 2024

(54) HANDLE SWITCH DEVICE

(71) Applicant: TOYO DENSO KABUSHIKI KAISHA, Tokyo (JP)

(72) Inventors: Yusuke Tominaga, Tsurugashima (JP);
Shingo Miyayama, Tsurugashima (JP);
Tomoyuki Tajima, Tsurugashima (JP)

(73) Assignee: TOYO DENSO KABUSHIKI KAISHA, Tokyo (JP)

( * ) Notice: Subject to any disclaimer, the term of this patent is extended or adjusted under 35 U.S.C. 154(b) by 350 days.

(21) Appl. No.: 17/399,156

(22) Filed: Aug. 11, 2021

(65) Prior Publication Data

US 2022/0048589 A1    Feb. 17, 2022

(30) Foreign Application Priority Data

Aug. 17, 2020    (JP) ................................. 2020-137553

(51) Int. Cl.
*B62K 23/02*    (2006.01)
*B62K 11/14*    (2006.01)

(52) U.S. Cl.
CPC .............. *B62K 11/14* (2013.01); *B62K 23/02* (2013.01)

(58) Field of Classification Search
CPC .......... H01H 13/14; H01H 13/08; H01H 9/06; H01H 13/04; B62K 11/14; B62K 23/02; B62J 6/16; H01R 13/70; H01R 13/5213; H01R 2201/26; H01R 24/62; B60L 53/12; B60L 2200/12; B60L 53/14; Y02T 10/70; Y02T 10/7072; Y02T 90/14; Y02T 90/16

See application file for complete search history.

(56) References Cited

U.S. PATENT DOCUMENTS

| | | | |
|---|---|---|---|
| 6,344,621 B1 * | 2/2002 | Shiratori | B60R 16/0207 200/61.54 |
| 8,763,746 B2 * | 7/2014 | Tozuka | H01H 9/06 74/551.8 |
| 11,279,435 B2 * | 3/2022 | Yamazaki | B62J 6/16 |
| 2022/0041241 A1 * | 2/2022 | Tominaga | B62J 45/00 |
| 2022/0158466 A1 * | 5/2022 | Choi | B25J 9/16 |

FOREIGN PATENT DOCUMENTS

| | | |
|---|---|---|
| CN | 206813166 U | 12/2017 |
| JP | 2004-224192 A | 8/2004 |
| JP | 2017-159677 A | 9/2017 |

\* cited by examiner

*Primary Examiner* — Ahmed M Saeed
(74) *Attorney, Agent, or Firm* — Keating & Bennett, LLP

(57) ABSTRACT

A handle switch device capable of supplying electric power to an external device without damaging electronic components. A handle switch device 10 comprises a main substrate 20, on which electronic components are disposed, a USB substrate 19, on which a USB port 18 for supplying electric power to an external device is disposed, and a switch housing 12 that houses the main substrate 20 and the USB substrate 19. The main substrate 20 and the USB substrate 19 are disposed so as to be separated from each other.

9 Claims, 6 Drawing Sheets

HANDLE SWITCH DEVICE

BACKGROUND OF THE INVENTION

Field of the Invention

The present invention relates to a handle switch device that is mounted on a handlebar of a vehicle.

Description of the Related Art

In recent years, a mobile device, on which a navigation application is installed, is often used in a saddle riding type vehicle such as a two-wheel vehicle as a navigation device. However, since the navigation application is used continuously while driving the saddle riding type vehicle, there is a possibility that a charged capacity of a battery of the mobile device becomes zero due to an increase in electric power consumption.

Therefore, various methods for constantly supplying electric power from a battery or a generator of the vehicle to the mobile device while the navigation application is used, are suggested. For example, a method that a pipe-shaped charging adapter housing a transformer is mounted on the vehicle, the transformer is connected to a power supply of the vehicle, and the electric power is supplied to the mobile device from a connection terminal connected to the transformer via a power cord, is suggested (for example, see Japanese Laid-open Patent Publication (Kokai) No. 2017-159677).

Further, as a simpler method for neatly supplying electric power to a mobile device, a method that a USB port for supplying electric power is provided on a handle switch device mounted on a handlebar, is suggested by applicants of the present invention. In this case, electronic components such as a transformer, etc. are disposed within a switch housing of the handle switch device.

However, since an insertion opening for a USB connector of the USB port opens toward outside, there is a possibility that water such as rainwater enters the switch housing from the insertion opening, the electronic components such as the transformer, etc. are submerged, a short circuit occurs, and then the electronic components will be damaged. It should be noted that the "electronic components" in the present specification include various components for realizing an electrical connection with an external device such as the mobile device via the USB port. For example, switches, transistors, resistors, LEDs, capacitors, connectors and wires that are mounted on substrates belong to the "electronic components" in the present specification.

SUMMARY OF THE INVENTION

The present invention provides a handle switch device capable of supplying electric power to an external device without damaging electronic components.

Accordingly, an aspect of the present invention is to provide a handle switch device comprising a main substrate, on which electronic components are disposed, a connection terminal substrate, on which a connection terminal for supplying electric power to an external device is disposed, and a switch housing that is provided with at least one switch and houses the main substrate and the connection terminal substrate. The main substrate and the connection terminal substrate are disposed so as to be separated from each other.

According to the present invention, since the main substrate, on which the electronic components are disposed, and the connection terminal substrate, on which the connection terminal for supplying electric power to the external device is disposed, are disposed so as to be separated from each other, the connection terminal substrate can be disposed so that water that enters through an insertion opening of the connection terminal does not reach the electronic components of the main substrate. Therefore, it is possible to supply electric power to the external device without damaging the electronic components.

Further features of the present invention will become apparent from the following description of exemplary embodiments with reference to the attached drawings.

DESCRIPTION OF THE EMBODIMENTS

Hereinafter, an embodiment of the present invention will be described in detail with reference to the drawings.

Figure 1:
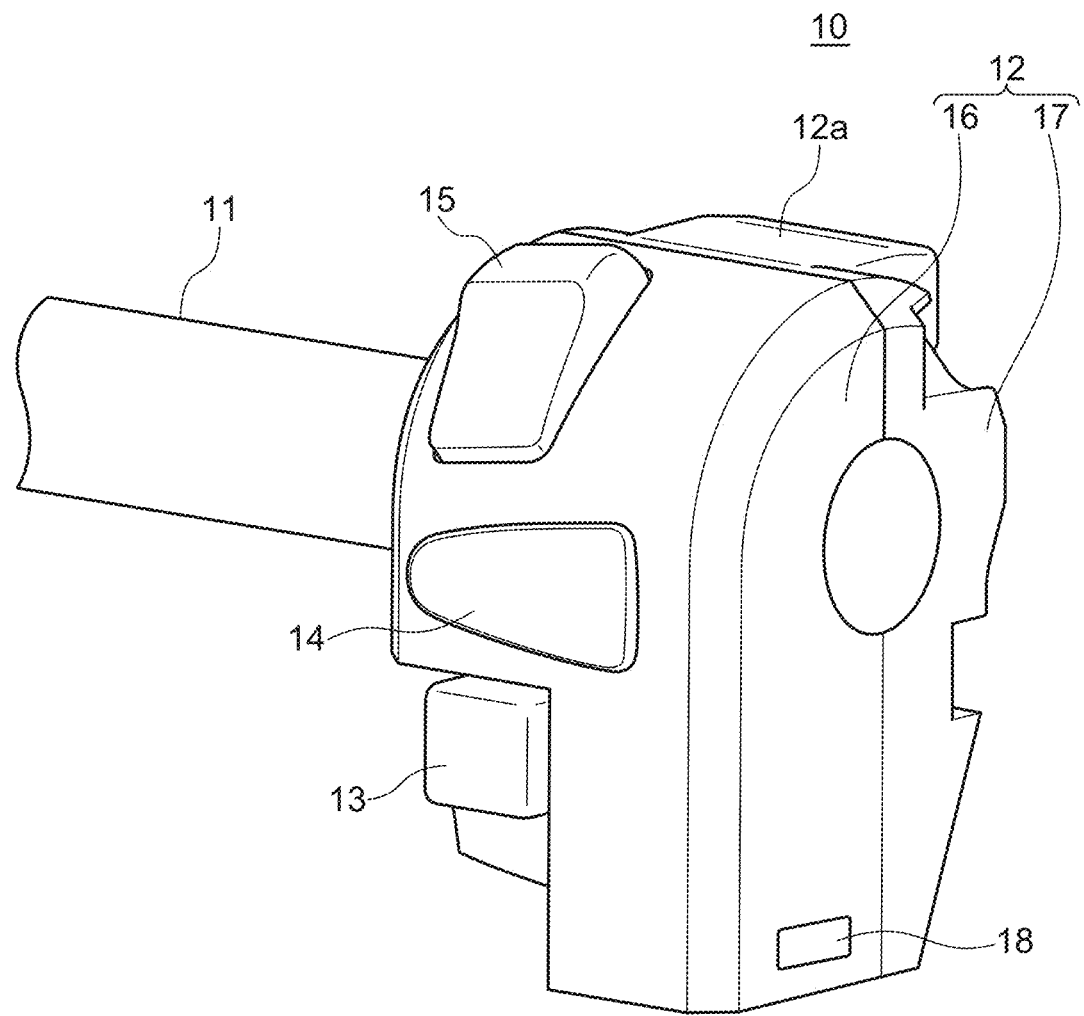
FIG. 1 is a perspective view that schematically shows an external appearance of a handle switch device according to an embodiment of the present invention.

FIG. 1 is a perspective view that schematically shows an external appearance of a handle switch device 10 according to the embodiment. As shown in FIG. 1, the handle switch device 10 includes a case-shaped switch housing 12 that is mounted on a cylindrical handlebar 11. The switch housing 12 has a front housing 16 (hereinafter, referred to as "a first housing") that is disposed on a driver side with respect to a vehicle running direction and a rear housing 17 (hereinafter, referred to as "a second housing") that is disposed on a side opposite to a driver with respect to the vehicle running direction.

For example, a winker switch 13, a horn switch 14 and a dimmer switch 15 that receive operation inputs of the driver are mounted on the front housing 16. On the other hand, none of the winker switch 13, the horn switch 14 and the dimmer switch 15 is mounted on the rear housing 17. Further, the front housing 16 and the rear housing 17 are fastened to each other by two screws (not shown) so that the handlebar 11 is sandwiched between the front housing 16 and the rear housing 17, and the front housing 16 and the rear housing 17 are mounted on the handlebar 11.

Figure 2:
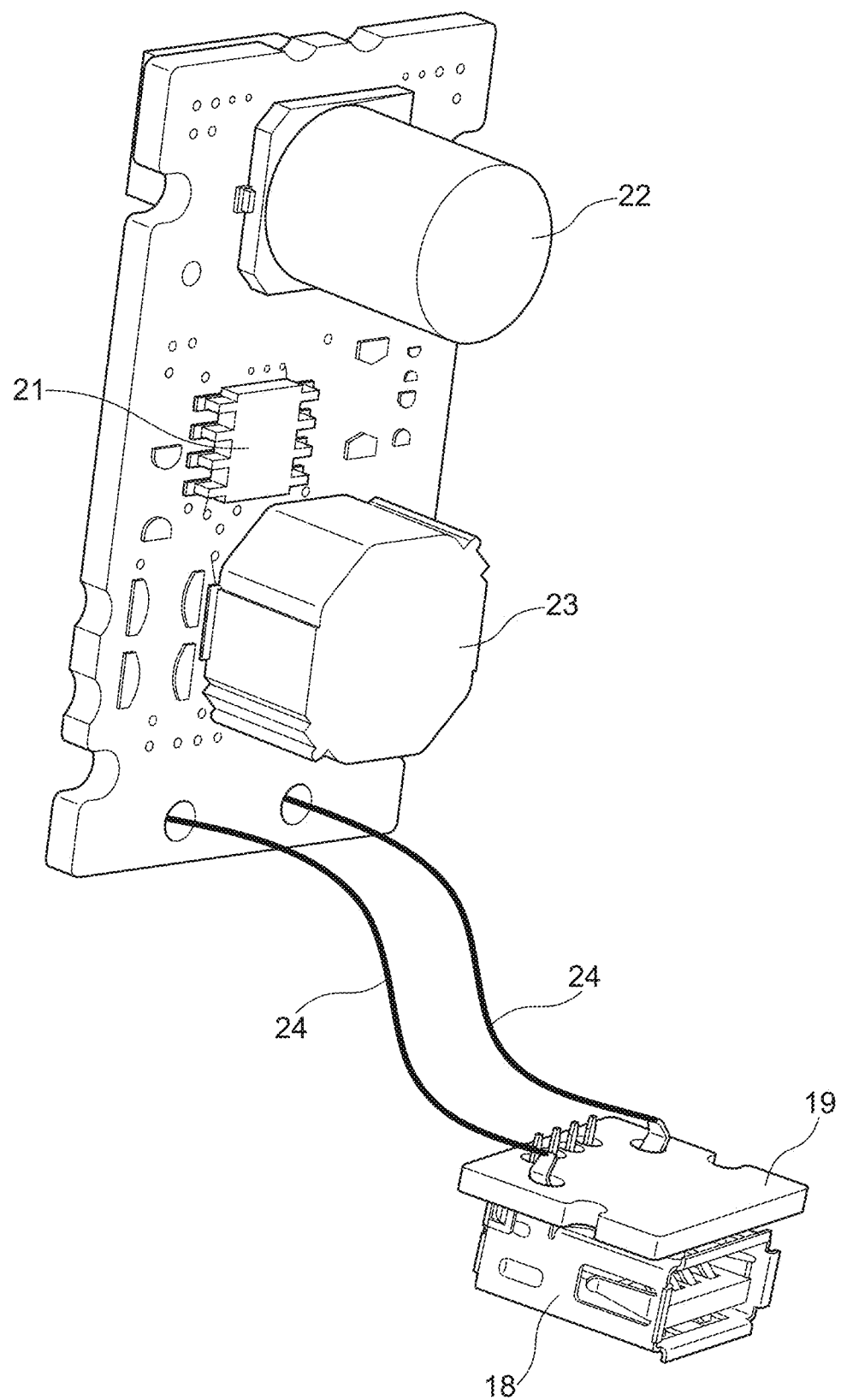
FIG. 2 is a view for schematically illustrating structures of a USB substrate and a main substrate that are provided in the handle switch device.

Furthermore, the handle switch device 10 includes a USB port 18 (hereinafter, also referred to as "a connection terminal"), which is a connection terminal that follows the USB (Universal Serial Bus) standard. As shown in FIG. 2, the USB port 18 is disposed on a USB substrate 19 (hereinafter, also referred to as "a connection terminal substrate"), which is a printed circuit board. The USB port 18 supplies electric power to an external device via a USB connector of a power cord of the external device, which is inserted into the USB port 18. As the external device, to which the USB port 18 supplies electric power, for example, there are a small navigation device, an on-vehicle equipment for an electronic toll collection system, a mobile device such as a smartphone, an action camera, an intercom, a drive recorder, an altimeter and a heat warmer. The USB port 18 is disposed inside the switch housing 12 so that an insertion opening for the USB connector opens on a surface of the switch housing 12.

Further, the handle switch device 10 includes a main substrate 20 (hereinafter, also referred to as "a main substrate") inside the switch housing 12. The main substrate 20 is connected to a power supply of a vehicle such as a battery or a generator and supplies electric power to the USB port 18 of the USB substrate 19. The main substrate 20 is a printed circuit board, and as shown in FIG. 2, includes electronic components such as a DC/DC converter 21, an aluminum electrolytic capacitor 22 and a power inductor 23. Each electronic component of the main substrate 20 cuts noises of the electric power supplied from the power supply of the vehicle and transforms a voltage applied from the power supply of the vehicle into a voltage that can be used by the external device.

On the other hand, although the USB substrate 19 includes the USB port 18 that is a mechanical connection terminal, but does not include other electronic components. Therefore, even in the case that the USB substrate 19 is submerged, there is no risk that the electronic components will be damaged. As shown in FIG. 2, the USB substrate 19 and the main substrate 20 are connected by two cords 24 (wiring). As a result, the main substrate 20 and the USB substrate 19 can be disposed so as to be separated from each other. Further, since each cord 24 is freely bendable, it is possible to freely set a relative positional relationship between the USB substrate 19 and the main substrate 20.

Figure 3:
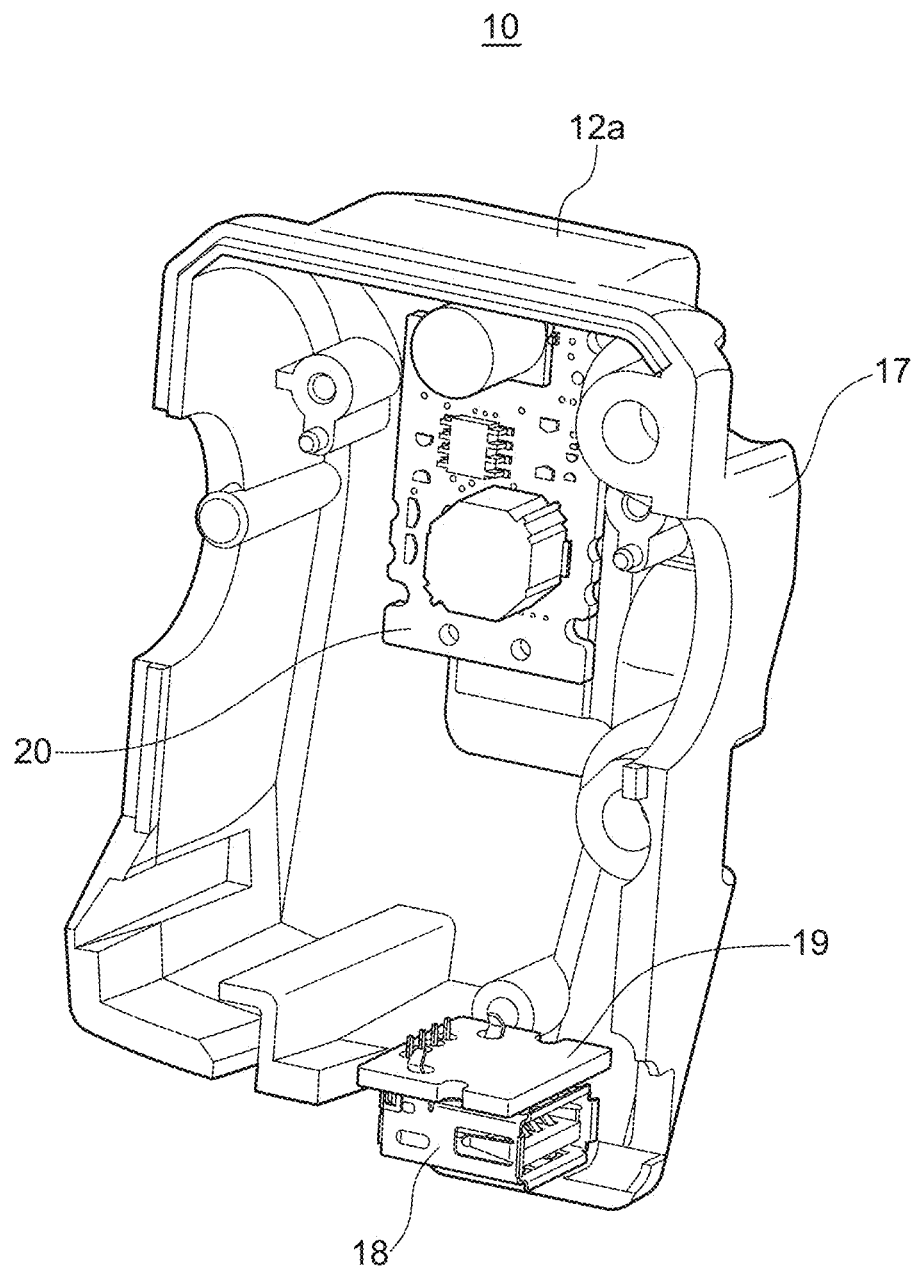
FIG. 3 is a view for illustrating a positional relationship between the USB substrate and the main substrate in the handle switch device.
Figure 4:
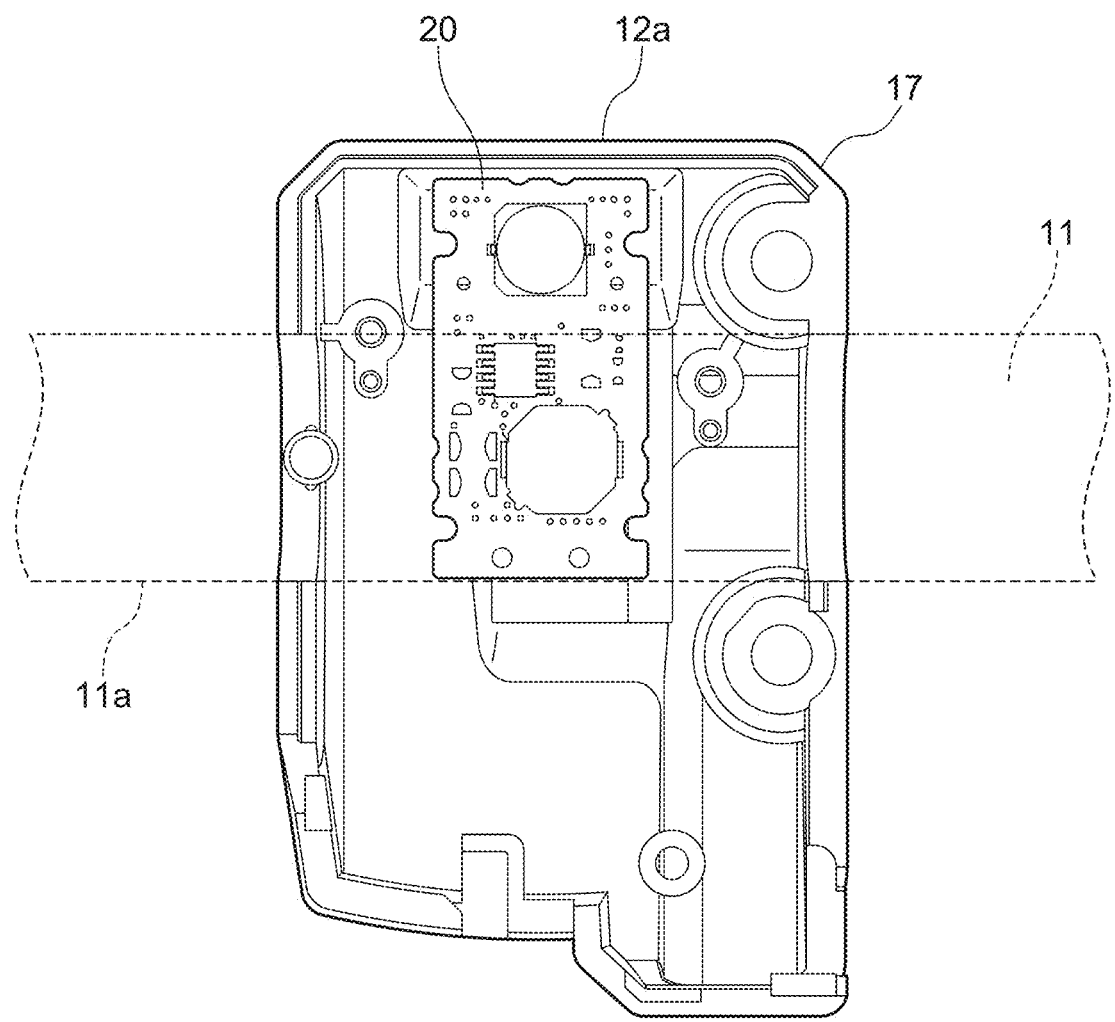
FIG. 4 is a view for illustrating a positional relationship between the main substrate and a handlebar in the handle switch device.

FIG. 3 is a view for illustrating the positional relationship between the USB substrate 19 and the main substrate 20 in the handle switch device 10. Further, FIG. 4 is a view for illustrating a positional relationship between the main substrate 20 and the handlebar 11 in the handle switch device 10. In FIGS. 3 and 4, in order to facilitate understanding, a part of a structure housed in the front housing 16 and the switch housing 12 is omitted.

In a state that the main substrate 20 is disposed within the rear housing 17 and the handle switch device 10 is mounted on the handlebar 11, as shown in FIG. 4, the main substrate 20 is disposed so that a lower part of the main substrate 20 is positioned at almost the same height as a lowermost part 11a of the handlebar 11. Or, the main substrate 20 is disposed so that the lower part of the main substrate 20 is positioned above the lowermost part 11a of the handlebar 11. It should be noted that the lowermost part 11a of the handlebar 11 is a lowermost part in a cross section of the handlebar 11.

Further, in a state that the handle switch device 10 is mounted on the handlebar 11, as shown in FIG. 3, the main substrate 20 is disposed so as to be positioned above the USB substrate 19. Moreover, an arrangement place of the USB substrate 19 is not limited to a position of the USB substrate 19 shown in FIG. 3. For example, the USB substrate 19 can be disposed at a position below the main substrate 20 that the insertion opening can be opened on the surface of the switch housing 12.

According to the embodiment, since the USB substrate 19 and the main substrate 20 are disposed so as to be separated from each other, the USB substrate 19 can be disposed so that water that has entered through the insertion opening of the USB port 18 does not reach the electronic components of the main substrate 20. Therefore, it is possible to supply electric power to the external device without damaging the electronic components of the main substrate 20.

Further, in the embodiment, in the state that the handle switch device 10 is mounted on the handlebar 11, the main substrate 20 is disposed so as to be positioned above the USB substrate 19. As a result, it is possible to reliably prevent water that has entered through the insertion opening of the USB port 18 disposed on the USB substrate 19 from reaching the main substrate 20. Furthermore, in the embodiment, in the state that the handle switch device 10 is mounted on the handlebar 11, the main substrate 20 is disposed so as to be positioned above the lowermost part 11a of the handlebar 11. Therefore, even in the case that water has entered from a gap between the handlebar 11 and the switch housing 12, since the water that has entered falls from the lowermost part 11a of the handlebar 11 inside the switch housing 12, the main substrate 20 will not be submerged. As a result, it is possible to reliably prevent the electronic components of the main substrate 20 from being damaged due to the short circuit.

Figure 5A:
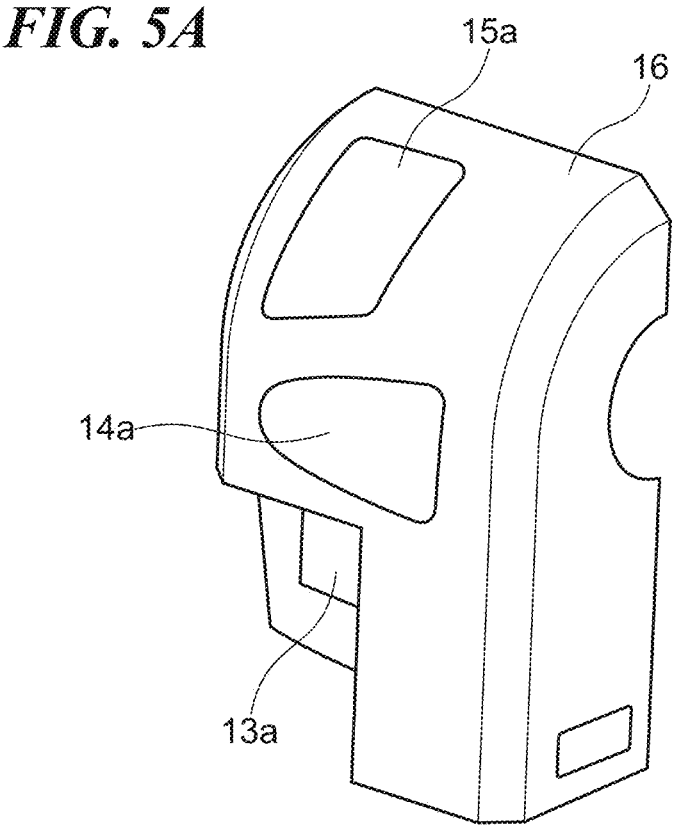
FIGS. 5A and 5B are views for illustrating an arrangement state of switch mounting holes of a front housing and a rear housing.
Figure 5B:
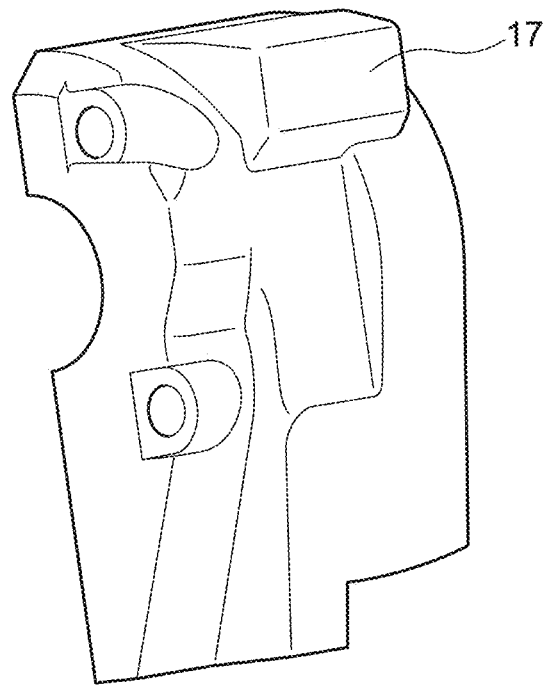

Further, since the winker switch 13, the horn switch 14 and the dimmer switch 15 are mounted on the front housing 16, as shown in FIG. 5A, switch mounting holes 13a, 14a and 15a for mounting these switches are formed in the front housing 16. In order to ensure a degree of freedom of operation of each switch's operating element, a gap is provided between each switch mounting hole and each operating element. However, there is a possibility that water such as rainwater enters inside of the front housing 16 through such a gap. On the other hand, as described above, since none of the winker switch 13, the horn switch 14 and the dimmer switch 15 is mounted on the rear housing 17, as shown in FIG. 5B, no switch mounting holes are formed in the rear housing 17, as a result, there is no risk that water enters inside of the rear housing 17. Hence, in the embodiment, the main substrate 20 is disposed within the rear housing 17. Therefore, it is possible to prevent the main substrate 20 from being submerged. Moreover, holes for mounting various switches may be provided in the rear housing 17, but in this case, it is preferable to dispose the main substrate 20 at a position where the main substrate 20 is not submerged by water that enters from the holes for mounting various switches.

Further, in the embodiment, the main substrate 20 may be brought close to a top surface 12a positioned above the switch housing 12 and may be disposed below the top surface 12a. As a result, it is possible to prevent the main substrate 20 from being submerged due to water such as rainwater entering from a mating surface that the front housing 16 is mated with the rear housing 17.

Figure 6:
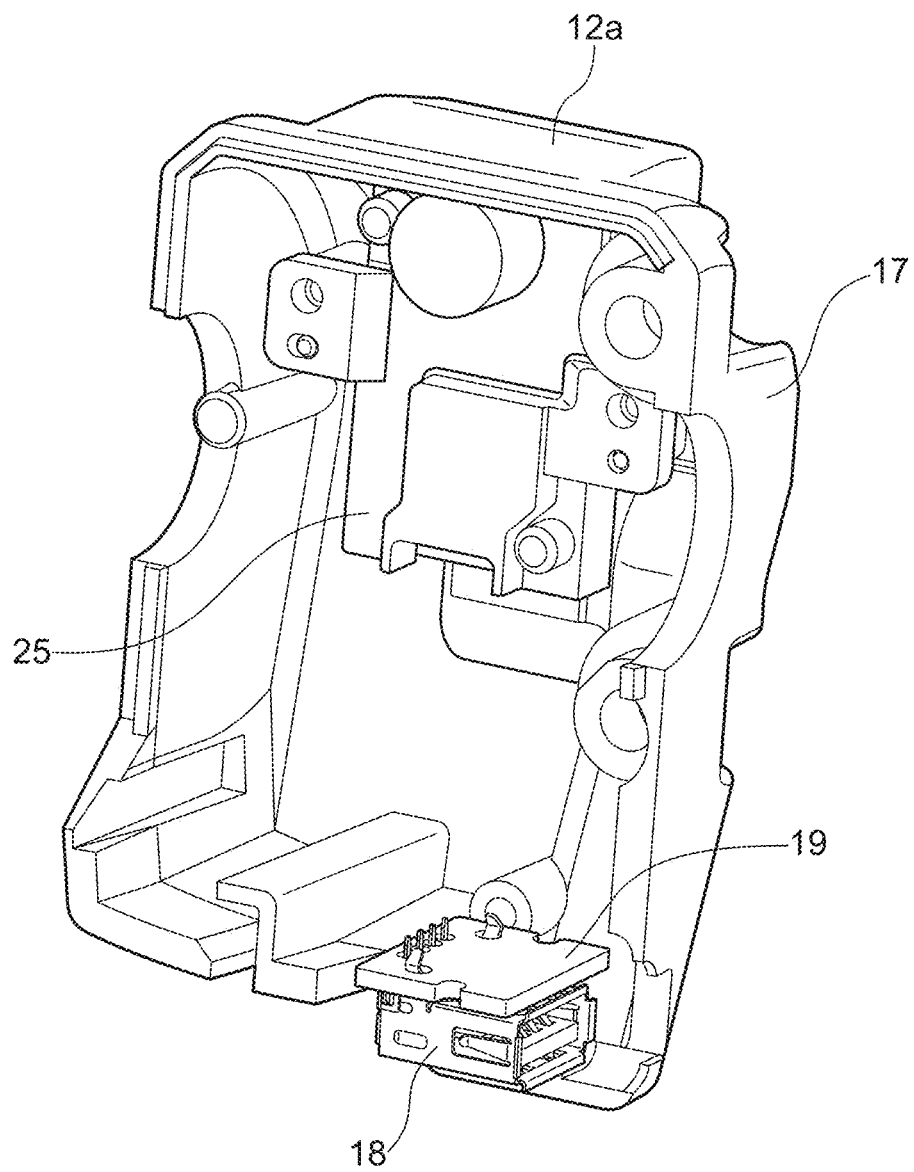
FIG. 6 is a view for illustrating a state that the main substrate is covered with a cover member.

Furthermore, as shown in FIG. 6, the main substrate 20 may be covered with a cover member 25 made of a resin material. Moreover, it is more preferable that the entire main substrate 20 is surrounded and covered with the cover member 25 and an inner wall surface of the switch housing 12. As a result, it is possible to improve water resistance of the main substrate 20.

In FIG. 6, although the cover member 25 is disposed so that a lower end part of the cover member 25 is positioned at almost the same height as a lower end part of the main substrate 20, but the cover member 25 may be disposed so that the lower end part of the cover member 25 is positioned below the lower end part of the main substrate 20. In this case, it is possible to reduce a phenomenon that water falling along a surface of the cover member 25 adheres to the main substrate 20.

Further, in the embodiment, since the USB substrate 19 is provided separately from the main substrate 20, in the case that the USB port 18 is damaged, it is possible to recover from damage to the USB port 18 by replacing only the USB substrate 19 without replacing the main substrate 20. As a result, it is possible to improve a maintainability of the handle switch device 10.

Although the preferred embodiment of the present invention has been described above, the present invention is not limited to the above-described embodiment, and various modifications and changes can be made within the scope of the gist of the present invention.

For example, although the handle switch device 10, to which the present invention is applied, is mounted on the handlebar 11 on a left side of the vehicle, but the present invention may be applied to a handle switch device mounted on a handlebar on a right side of the vehicle. Moreover, the present invention can be applied to both a handle switch device mounted on a bar-type handlebar and a handle switch device mounted on a separate type handlebar.

Further, the main substrate 20 may be disposed within the switch housing 12 in a standing state with respect to a vehicle width direction and a vehicle front-rear direction, more preferably almost vertically. As a result, even in the case that the main substrate 20 is submerged, since water is easier to be drained downward, it is possible to reduce a probability that each electronic component of the main substrate 20 will be submerged. Moreover, it is also possible that each electronic component mounted on the main substrate 20 is disposed on a switch substrate for various switches, which are disposed within the switch housing 12, and functions of the main substrate 20 is imparted to the switch substrate for various switches. In this case, the main substrate 20 can be eliminated, as a result, it is possible to put a flexibility into a layout inside the switch housing 12.

Further, in the embodiment, although both the USB substrate 19 and the main substrate 20 are configured by a printed circuit board, both the USB substrate 19 and the main substrate 20 may be configured by a flexible circuit board. In this case, since the USB substrate 19 and the main substrate 20 can be bent, it is possible to improve a degree of freedom of arranging these substrate s, and as a result, it is possible to contribute to further miniaturization of the handle switch device 10.

Moreover, it is possible to apply the handle switch device 10 according to the embodiment to any vehicle that is provided with a handlebar. For example, vehicles, to which the handle switch device 10 can be applied, are so-called saddle riding type vehicles. Further, the so-called saddle riding type vehicles include motorcycles, three-wheel vehicles and four-wheel vehicles that are classified as ATVs (All Terrain Vehicles), and snowmobiles. Furthermore, it is also possible to apply the handle switch device 10 to a small slide type saddle-riding vessel that is provided with a handle.

This application claims the benefit of Japanese Patent Application No. 2020-137553 filed on Aug. 17, 2020 which is hereby incorporated by reference herein in its entirety.

What is claimed is:

1. A handle switch device comprising:
a main substrate, on which electronic components are disposed;
a connection terminal substrate, on which a connection terminal for supplying electric power to an external device is disposed; and
a switch housing that is provided with at least one switch and houses the main substrate and the connection terminal substrate; wherein
the switch housing comprises:
a first housing, on which various switches are mounted; and
a second housing, on which the various switches are not mounted;
the first housing is disposed on a driver side with respect to a vehicle running direction;
the second housing is disposed on a side opposite to a driver with respect to the vehicle running direction;
the main substrate is mounted on the second housing; and
the main substrate and the connection terminal substrate are disposed so as to be separated from each other.

2. The handle switch device according to claim 1, wherein the main substrate and the connection terminal substrate are connected to each other by freely bendable wiring.

3. The handle switch device according to claim 1 or 2, wherein the connection terminal substrate has the connection terminal.

4. The handle switch device according to claim 1 or 2, wherein the main substrate is positioned above the connection terminal substrate.

5. The handle switch device according to claim 1 or 2, wherein the main substrate is disposed so that a lower part of the main substrate is positioned at almost the same height as a lowermost part of a handlebar of a vehicle, on which the switch housing is mounted, or is positioned above the lowermost part of the handlebar.

6. The handle switch device according to claim 1 or 2, wherein the main substrate is disposed below a top surface of the switch housing.

7. The handle switch device according to claim 1 or 2, wherein the main substrate is disposed so as to be covered with a cover member.

8. The handle switch device according to claim 7, wherein the main substrate is surrounded by an inner wall surface of the switch housing and the cover member.

9. The handle switch device according to claim 7, wherein the cover member is disposed so that a lower end part of the cover member is positioned at almost the same height as a lower end part of the main substrate, or is positioned below the lower end part of the main substrate.

* * * * *